United States Patent
Droms et al.

(10) Patent No.: US 8,135,028 B2
(45) Date of Patent: *Mar. 13, 2012

(54) NEIGHBOR DISCOVERY IN CABLE NETWORKS

(75) Inventors: Ralph Edward Droms, Westford, MA (US); Madhu Sudan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/572,184

(22) Filed: Oct. 1, 2009

(65) Prior Publication Data

US 2010/0020821 A1    Jan. 28, 2010

Related U.S. Application Data

(63) Continuation of application No. 11/026,641, filed on Dec. 30, 2004, now Pat. No. 7,646,786.

(60) Provisional application No. 60/574,506, filed on May 25, 2004, provisional application No. 60/574,876, filed on May 26, 2004, provisional application No. 60/582,732, filed on Jun. 22, 2004, provisional application No. 60/588,635, filed on Jul. 16, 2004, provisional application No. 60/590,509, filed on Jul. 23, 2004.

(51) Int. Cl.
*H04J 3/16* (2006.01)
(52) U.S. Cl. ........................ 370/465; 370/401; 370/254
(58) Field of Classification Search ........................ None
See application file for complete search history.

(56) References Cited

U.S. PATENT DOCUMENTS

| | | | |
|---|---|---|---|
| 6,331,987 B1 | 12/2001 | Beser | |
| 6,751,230 B1 | 6/2004 | Vogel et al. | |
| 6,807,193 B1 | 10/2004 | Beser | |
| 6,829,250 B2 | 12/2004 | Voit et al. | |
| 6,930,988 B2 | 8/2005 | Koodli et al. | |
| 6,986,157 B1 | 1/2006 | Fijolek et al. | |
| 7,023,871 B2 | 4/2006 | Lind et al. | |
| 7,050,419 B2 | 5/2006 | Azenkot et al. | |
| 7,467,227 B1 * | 12/2008 | Nguyen et al. | ................ 709/239 |
| 7,490,345 B2 | 2/2009 | Rakib et al. | |
| 7,492,763 B1 | 2/2009 | Alexander, Jr. | |
| 7,548,558 B2 | 6/2009 | Rakib et al. | |
| 7,613,209 B1 | 11/2009 | Nguyen et al. | |

(Continued)

FOREIGN PATENT DOCUMENTS

WO    0242882    5/2002

(Continued)

OTHER PUBLICATIONS

Fellows et al., "DOCSIS Cable Modem Technology", IEEE Communication Magazine, vol. 39, Issue 3, Mar. 2001, pp. 202-209.

*Primary Examiner* — Robert Wilson
(74) *Attorney, Agent, or Firm* — Stolowitz Ford Cowger LLP

(57) ABSTRACT

A network device has a communications link to allow the device to communicate with customer devices and a processor. The processor is to receive neighbor discovery messages from requesting customer devices, examine the neighbor discovery messages to determine if the neighbor discovery message should be forwarded to other of the customer devices, and respond to the requesting customer devices.

16 Claims, 2 Drawing Sheets

U.S. PATENT DOCUMENTS

| | | |
|---|---|---|
| 7,646,786 B2 * | 1/2010 | Droms et al. ................ 370/465 |
| 2002/0062450 A1 | 5/2002 | Carlson et al. |
| 2002/0097733 A1 | 7/2002 | Yamamoto |
| 2003/0026230 A1 | 2/2003 | Ibanez et al. |
| 2003/0043802 A1 | 3/2003 | Yazaki et al. |
| 2004/0071148 A1 | 4/2004 | Ozaki et al. |
| 2005/0010958 A1 | 1/2005 | Rakib et al. |
| 2005/0078699 A1 | 4/2005 | Cummings |
| 2005/0220126 A1 | 10/2005 | Gervais et al. |
| 2006/0098669 A1 | 5/2006 | Enns et al. |

FOREIGN PATENT DOCUMENTS

| | | |
|---|---|---|
| WO | 2004006503 | 1/2004 |

* cited by examiner

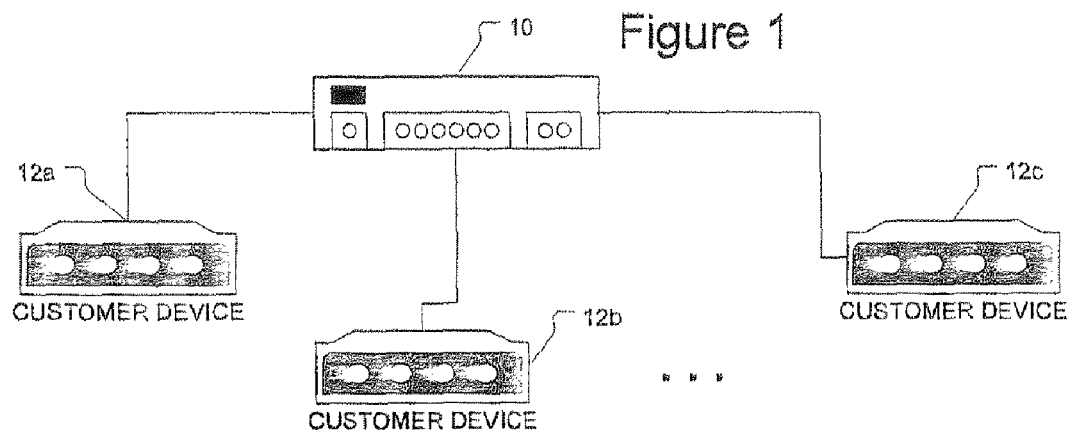
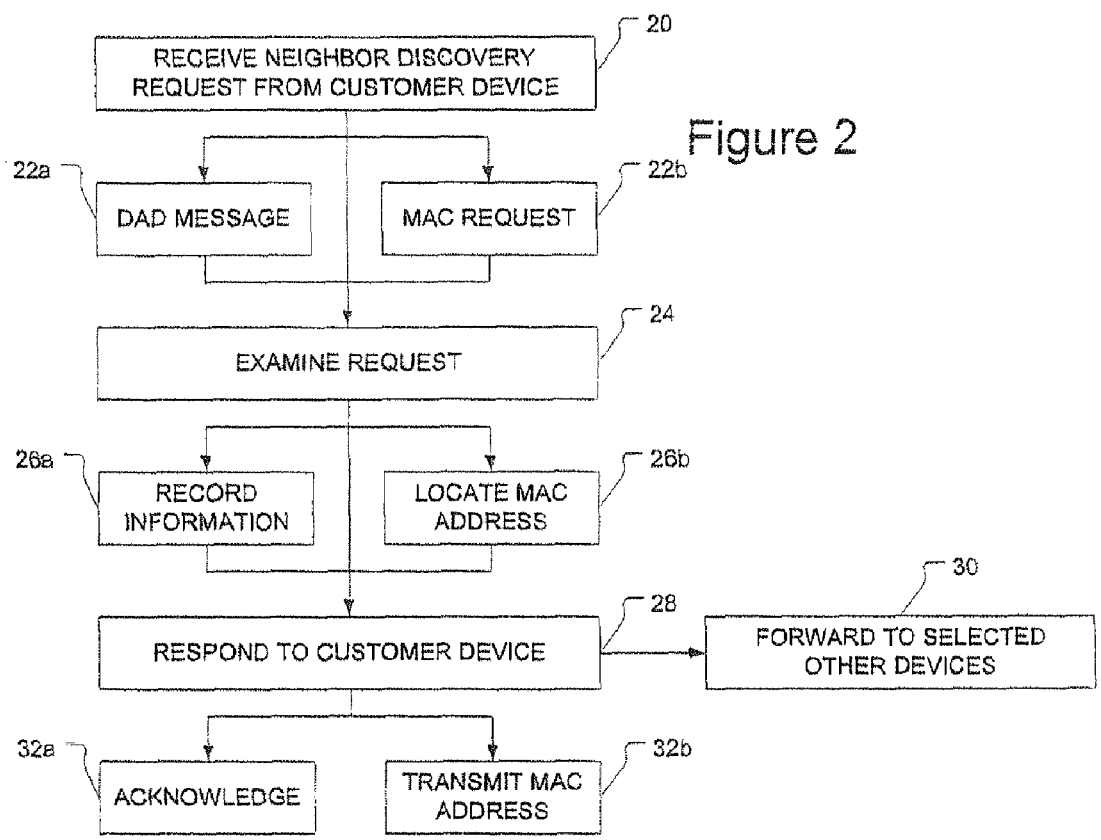

NEIGHBOR DISCOVERY IN CABLE NETWORKS

CROSS REFERENCE TO RELATED APPLICATIONS

This application is a continuation of non-provisional U.S. patent application Ser. No. 11/026,641 filed Dec. 30, 2004 (now U.S. Pat. No. 7,646,786), which claims priority from U.S. Provisional Applications Ser. Nos. 60/574,506 filed May 25, 2004; 60/574,876 filed May 26, 2004; 60/582,732 filed Jun. 22, 2004; 60/588,635 filed Jul. 16, 2004; and 60/590,509 filed Jul. 23, 2004.

TECHNICAL FIELD

The present disclosure relates generally to the field of cable networks.

BACKGROUND

Neighbor Discovery (ND) is a protocol currently being deployed in the Internet Protocol (IP) version 6, abbreviated here as IPv6. It is possible that subsequent versions of IP as well as other communications protocols may use similar protocols, all of which will be referred to here as neighbor discovery. The Neighbor Discovery protocol is specified in the Internet Engineering Task Force (IETF) Request for Comments (RFC) 2461, and concepts disclosed here, while discussed with regard to IPv6, may be applicable to other protocols.

Hosts, routers and other network devices using IPv6 use the Neighbor Discovery protocol messages for several purposes. A host may use neighbor discovery to identify the hardware address associated with an IP address, and perform duplicate address detection (DAD) when employing stateless address autoconfiguration. A host may use neighbor discovery to locate a network device such as a router. The network device will forward datagrams for the host. A network device such as a router may use neighbor discovery to identify itself to hosts on a link, and announce prefixes available on a link for hosts employing stateless address autoconfiguration. Datagrams, as that term is used here, are the 'bundles' of data employed to transmit data across the network, such as IP packets, Asynchronous Transfer Mode (ATM) cells, and Frame Relay (FR) frames.

Neighbor discovery messages are transmitted on a regular basis by both hosts and network devices. The neighbor discovery traffic on a link increases as the number of hosts on the link increases, and can represent a significant fraction of the total traffic on a link. Neighbor discovery messages are often sent to a multicast address, so that those messages are delivered to all of the hosts on a link and are individually processed by each host on a link.

When IPv6 is deployed by a service provider to customers over a cable medium, the network is often constructed so all of the "customer devices", or hosts, are connected to a single "network device", which forwards datagrams sent from customer devices. For example, customer premises equipment (CPE) devices (customer devices) are attached to the same cable modem termination system CMTS device (network device). The customer devices may be either cable modems (CMs) or home computers (PCs).

The upstream and downstream connectivity between the network device and the customer devices is asymmetric. In the downstream direction, from network device to customer device, the physical link is shared by all the customer devices. Hence they appear to be connected to the same link.

In the upstream direction, i.e., customer device to network device, the link is not shared; each device has its own unidirectional physical link to the network device. Hence, data sent by one device is not visible to the other devices. There are sometimes as many as 50,000 customer devices connected to a single network device. All of these devices generate neighbor discovery messages which are sent to various multicast addresses on the link, generating significant overhead on the link and causing significant processing overhead on the other customer devices receiving the neighbor discovery messages.

SUMMARY

One embodiment of the invention is a network device having a communications link to communicate with customer devices. The processor in the network device is to receive neighbor discovery messages from requesting customer devices, examine the neighbor discovery messages to determine if the neighbor discovery message should be forwarded to other of the customer devices, and respond to the requesting customer devices.

Another embodiment of the invention is a method of processing neighbor discovery messages. The method receives a neighbor discovery message from a requesting customer device. The neighbor discovery message is examined to determine if the neighbor discovery needs to be forwarded to any other customer devices. The requesting customer device is then responded to.

BRIEF DESCRIPTION OF THE DRAWINGS

Embodiments of the invention may be best understood by reading the disclosure with reference to the drawings, wherein:

FIG. 1 shows an embodiment of a network device in communication with several customer devices.

FIG. 2 shows a flowchart of an embodiment of a method to process neighbor discovery messages.

DETAILED DESCRIPTION OF THE EMBODIMENTS

Figure 3:
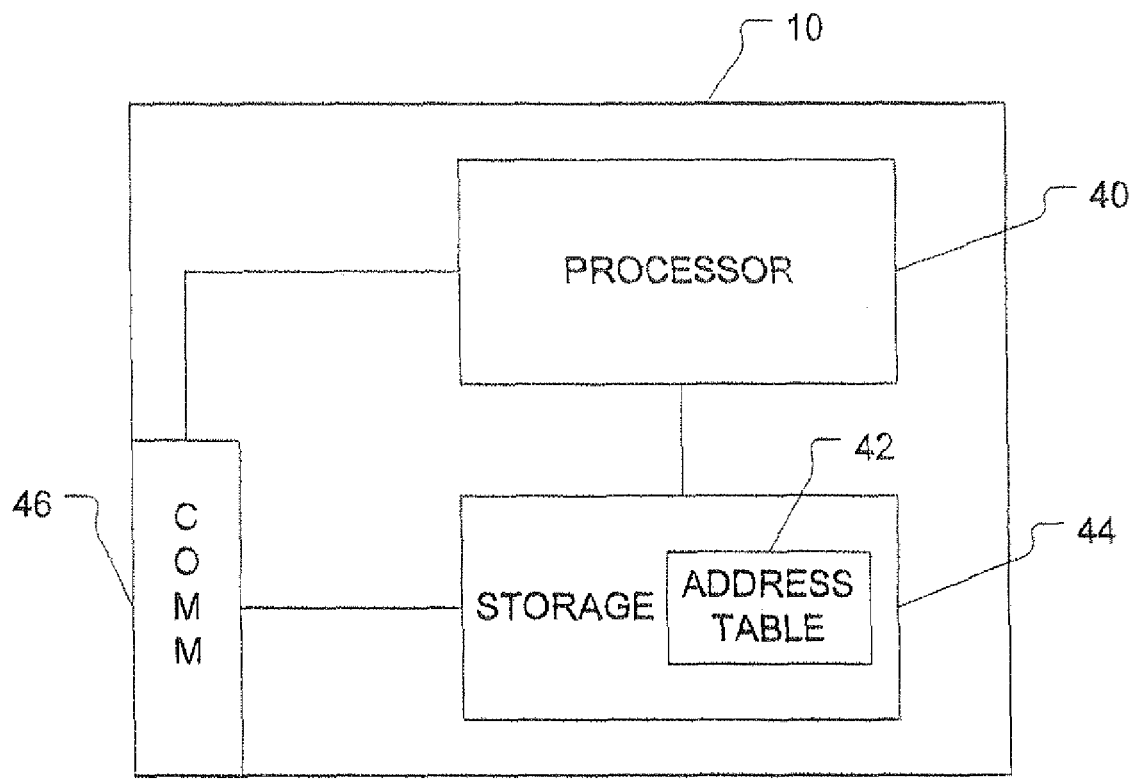
FIG. 3 shows an embodiment of a network device.

An embodiment of a portion of a cable data network is shown in FIG. 1. The network device 10 serves as a connection between the customer devices 12a-12c and the network. The customer devices may be cable modems or home computers (PCs). As many as fifty thousand customer devices connected to a single network device.

As discussed previously, in a cable modem network deploying IPv6 with neighbor discovery, or similar discovery protocols, the messages will generate significant overhead on the link, and significant processing overhead on the customer and network devices. For example, when the customer device 12a initializes it sends a neighbor discovery message across its connection to the network device 10 to perform duplicate address detection (DAD). The DAD process allows a device to determine if its chosen address is duplicated in the system. If it is duplicated, there are mechanisms in the DAD process to allow for selection of a unique address. Currently, the network device relays this message to any other customer devices that are currently connected to the network device, such as cable modems 12b through 12c. Each customer device receives a copy of the message from the customer device 12a.

Similarly, a customer device may need to identify the Media Access Control (MAC) address associated with a network address. Generally, this occurs when a customer device such as 12a is sending a packet to the network address of another device such as 12c. The customer device 12a sends a neighbor discovery message to determine the MAC address of the device that is associated with that network address. This message currently gets relayed by the network device to all of the customer devices.

One possible solution would be to filter out the messages for other devices at each customer device. All of these messages require some level of processing by each customer device, contributing to the inefficiencies of the network. Filtering the messages at the device interface on the customer device would alleviate part of this problem. However, it is not possible to do this in cable modem networks.

In embodiments of this invention, the network device uses filtering and proxying to reduce the link traffic and processing overhead in a cable network. The network device receives all of the messages from the customer devices prior to relaying them out to the other customer devices. By altering the operation of the network device, it is possible to avoid sending out a bulk of the neighbor discovery messages to other customer devices.

FIG. 2 shows an embodiment of a method to process neighbor discovery messages. At 20, the network device receives a neighbor discovery request from the customer device. Essentially, the network device intercepts the message. These messages may be DAD messages 22a, MAC address requests 22b, or other types of messages, such as multicast messages. These specific examples will be addressed at each part of the process to demonstrate principles of the invention.

At 24, the message is examined. The network device 'reads' the message and determines the appropriate action needed in response. For example, when the message is a DAD message from a customer device 12a performing initialization, the network device would intercept the message and examine it at 24. If the message is a DAD message, at 26a, the network device examines its list of customer device information. If the network address does not already appear in the list, the network device forwards the request to selected other devices in 30.

If there is no response, the network device adds the network address, such as an IPv6 address and MAC address for the customer device to its list of customer device information. If the address does appear in the list of customer device information, or some other device responds to DAD request forwarded by the network device, the network device then responds to the customer device at 28, in this example by sending an acknowledgement of the address at 32a. This process is repeated for each device as it initializes, adding its information to the list and responding directly to the device, rather than sending them out to all of the other customer devices.

For the example of the message being a MAC address request 26b, a similar process occurs. The network device intercepts the neighbor discovery from the requesting customer device. It then accesses its list of customer device information to determine the MAC address associated with a particular network address. If the address in the request appears in the list, the network device sends a response to the requesting CPE at 28 and does not forward the message to any of the other customer devices. In this example, the response includes the requested MAC address at 32b. If the address in the request does not appear in the list of customer device information, the network device forwards the request to other devices in 30. Any responses from other devices are returned to the customer device that sent the original request in 32b.

In some instances, there may be a need to send the neighbor discovery request to other devices. In those cases, the network device would intercept the message and determine which, if any, other customer devices need to receive the message. The neighbor discovery message would only be sent to relevant customer devices at 30, not to all devices connected to the network device, as currently happens.

FIG. 3 shows an embodiment of network device 10 capable of functioning as a network device. The device has a communications link 46 to allow the device to communicate with customer devices. In a cable network, this communications link will generally be a cable link.

The device also has a processor 40 to receive neighbor discovery messages from requesting customer devices and to examine the neighbor discovery messages to determine if the neighbor discovery message should be forwarded to other of the customer devices. The processor also allows the device to respond to the requesting customer devices. The processor may be a general-purpose processor, a digital signal processor, etc., or any device that can process commands and perform the necessary operations of the network device.

In addition, the device may have a local storage 44 that contains the list of customer device information 42. This information may take the form of a table that lists the MAC address of devices associated with the devices network addresses. The storage may also be located elsewhere in the system.

Generally, the embodiments of this invention can be implemented in a currently existing network device. The software or firmware used to operate the processor of the network device could be altered to cause the device to perform the methods of the invention. The alteration will generally involve loading instructions that reside on an article of machine-readable media to the processor memory. The instructions, when executed, will cause the machine to perform the processes of the invention. In this case, the machine is the network device 10, operating as a network device.

Thus, although there has been described to this point a particular embodiment for a method and apparatus for neighbor discovery in cable systems, it is not intended that such specific references be considered as limitations upon the scope of this invention except in-so-far as set forth in the following claims.

What is claimed is:

1. A system, comprising:
   a database containing addressing information for a plurality of subscriber devices; and
   a processor coupled to the database, the processor configured to:
   receive traffic sent over a first network from the plurality of subscriber devices, forward traffic received from a second network over the first network to the plurality of subscriber devices;
   receive a neighbor discovery message originating from one of the plurality of subscriber devices and formatted to be forwarded to at least a non-originating one of the plurality of subscriber devices;
   identify an address corresponding to the received neighbor discovery message;
   compare the identified address to the database to determine whether the database includes a stored address corresponding to the identified address;
   forward the received neighbor discovery message if the corresponding stored address is absent from the database; and filter the received neighbor discovery message according to the comparison if the corresponding stored address is present in the database, said filtering preventing the neighbor discovery message from being forwarded to the at least one non-originating one of the plurality of subscriber devices.

2. The system of claim 1, wherein the second network is an aggregation network and the first network is an access network.

3. The system of claim 1, wherein one of the subscriber devices of the plurality of subscriber devices comprises a Customer Premise Equipment (CPE) device.

4. The system of claim 1, wherein the processor is further configured to send a reply back to the originating one of the plurality of subscriber devices if the received neighbor discovery message is not forwarded, the reply providing the stored address to the originating one of the plurality of subscriber devices.

5. The system of claim 1, wherein the processor is further configured to:
  extract a network address from the received neighbor discovery message;
  compare the extracted network address to the database; and
  forward the received neighbor discovery message only if the extracted network address is absent from the database.

6. The system of claim 1, wherein the processor is further configured to:
  identify a physical address corresponding to the received neighbor discovery message;
  compare the identified physical address to the database; and
  forward the received neighbor discovery message only if the identified physical address is absent from the database.

7. The system of claim 1, wherein the neighbor discovery message is sent to a destination selected by the originating one of the plurality of subscriber devices, and the processor is further configured to:
  intercept the neighbor discovery message; and
  identify, according to the comparison, at least one destination for forwarding the neighbor discovery message, the at least one identified destination being different than the selected destination.

8. A method, comprising:
  examining a received neighbor discovery message using a network device, the neighbor discovery message from an originating one of a plurality of subscriber devices and formatted to be forwarded to at least a non-originating one of the plurality of subscriber devices;
  identifying an address according to the examination using the network device, the identified address associated with information included in the neighbor discovery message;
  comparing, using the network device, the identified address to a database containing addressing information for the plurality of subscriber devices;
  filtering, using the network device, the neighbor discovery message according to the comparison, said filtering preventing the neighbor discovery message from being forwarded to the at least one non-originating one of the plurality of subscriber devices; and
  responding to the originating one of the plurality of subscriber devices using the network device if said filtering is performed.

9. The method of claim 8, wherein the neighbor discovery message is received in accordance with Internet Protocol version 6.

10. The method of claim 8, wherein the neighbor discovery message is a duplicate address detection message and the method further comprises:
  identifying the address by extracting the address from the duplicate address detection message; and
  forwarding the duplicate address detection message if the extracted address is absent from the database.

11. The method of claim 8, wherein the neighbor discovery message is a media access control address request message and the method further comprises:
  filtering the media access control address request message and responding to the originating one of the plurality of subscriber devices if the database includes a physical address corresponding to the identified address.

12. The method of claim 8, further comprising recording a network address and a media access control address for the originating one of the plurality of subscriber devices.

13. The method of claim 8, wherein the database includes a list of network addresses and associated media access control addresses, and the method further comprises:
  identifying one of the media access control addresses associated with a network address provided in the neighbor discovery message.

14. The method of claim 8, further comprising sending back a reply to the neighbor discovery message if the database includes a stored address that corresponds to the identified address, the reply sent to only the originating one of the plurality of subscriber devices.

15. The method of claim 8, further comprising sending back a reply to the neighbor discovery message if the database includes a stored address that corresponds to the identified address, the reply sent to the originating one of the plurality of subscriber devices and selected other devices connected to the network device.

16. An article of manufacture including a memory device having instructions stored thereon that, in response to execution by a computing device, cause the computing device to perform operations comprising:
  receiving and processing a message from an originating one of a plurality of subscriber devices, the message requesting an address determination;
  identifying an address according to the processing, the identified address associated with information included in the message;
  comparing the identified address to a list containing addressing information for the plurality of subscriber devices;
  determining whether the list includes a stored address corresponding to the identified address according to the comparison; and
  preventing the message from being forwarded to at least a non-originating one of the plurality of subscriber devices according to the determination, wherein the message is not forwarded to the at least one non-originating one of the plurality of subscriber devices if the stored address is present in the list.

\* \* \* \* \*